US000001288H

United States Statutory Invention Registration [19]

[11] Reg. Number: H1288

Lusk

[43] Published: Feb. 1, 1994

[54] CONTROL AND DIGITAL TELEMETRY ARRANGEMENT FOR AN AERIAL MISSILE

[75] Inventor: Kenneth P. Lusk, Ridgecrest, Calif.

[73] Assignee: The United States of America as represented by the Secretary of the Navy, Washington, D.C.

[21] Appl. No.: 504,452

[22] Filed: Apr. 4, 1990

[51] Int. Cl.[5] ..... H04Q 9/00

[52] U.S. Cl. ..... 340/870.07; 375/25; 102/374; 244/3.14; 244/3.19

[58] Field of Search ..... 340/870.07, 870.21, 340/870.13; 375/25; 102/374, 375, 379, 427; 244/3.11, 3.14, 3.15, 3.19

[56] References Cited

U.S. PATENT DOCUMENTS

| | | | |
|---|---|---|---|
| 3,729,150 | 4/1973 | Conger | 244/3.19 |
| 3,827,655 | 8/1974 | Humphrey et al. | 244/3.15 |
| 3,887,873 | 6/1975 | Duncan et al. | 340/870.13 |
| 3,962,537 | 6/1976 | Kearns et al. | 358/109 |
| 4,037,202 | 7/1977 | Terzian | 244/3.11 |
| 4,040,059 | 8/1977 | Simmons et al. | 340/870.13 |
| 4,240,596 | 12/1980 | Winderman et al. | 244/3.19 |
| 4,288,049 | 9/1981 | Alpers | 244/3.14 |
| 4,450,451 | 5/1984 | La Torre et al. | 242/3.19 |
| 4,488,489 | 12/1984 | Schoffl | 102/374 |
| 4,541,591 | 9/1985 | Chadwick et al. | 244/3.15 |
| 4,553,718 | 11/1985 | Pinson | 244/3.15 |
| 4,703,693 | 11/1987 | Spies et al. | 102/427 |

*Primary Examiner*—Bernarr E. Gregory

*Attorney, Agent, or Firm*—Sol Sheinbein; Melvin J. Sliwka; Harvey A. Gilbert

[57] ABSTRACT

A control and digital telemetry arrangement for an aerial missile includes a digital telemetry system, a firing circuit, a battery and a latching relay. The digital telemetry system receives an analog input telemetry signal and produces and transmits to a ground station a digital output telemetry signal representing the current status of missile functions. The firing circuit is connected to the telemetry system to indicate that a firing command signal for firing the missile rocket motor has been received. The battery is capable of being switched back and forth between non-conducting and conducting states. The latching relay is connected between the telemetry system and battery and the system and external ground power and capable of switching the battery from its non-conductive to conductive state for latching power from the battery to said telemetry system. The digital telemetry system, firing circuit, battery and latching relay are packaged in a cannister housing which, in turn, is mountable in the missile.

28 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONTROL AND DIGITAL TELEMETRY ARRANGEMENT FOR AN AERIAL MISSILE

BACKGROUND OF THE INVENTION

1. Field of the Invention

The present invention generally relates to telemetry systems and, more particularly, is concerned with a control and digital telemetry arrangement for an aerial missile.

2. Description of the Prior Art

Conventional telemetry systems have incorporated a pulse-amplitude modulation (PAM) format with frequency modulation (FM) transmitters. These are analog telemetry systems which have significant drawbacks.

The analog PAM format inherently incorporates an undesirable signal-to-noise ratio. Also, to be read by on-ground computers, the telemetered analog signals must first be converted to digital form. Further, the large physical dimensions cf FM transmitters make them undesirable for small diameter aerial missiles. Thus, past telemetry systems of PAM/FM format transmit an analog RF signal that is susceptable to noise, making it difficult for ground stations to discern between the transmitted signals and noise.

Consequently, a need exists for a telemetry system having a format which avoids the above-described drawbacks and can be used on small diameter aerial missiles.

SUMMARY OF THE INVENTION

The present invention provides a control and digital telemetry arrangement designed to satisfy the aforementioned needs. The arrangement of the present invention is compact enough that it can be packaged and housed in small diameter aerial missiles, such as missiles three inches or less in diameter. Further, the arrangement includes a digital telemetry system that can be used in a low signal-to-noise ratio environment because of the digital format of the output signals of the system. The digital output signals are easily encrypted and directly readable by on-ground computers, relieving ground crews of the necessity of first making analog-to-digital conversions as in the case of prior art telemetry systems which transmit analog signals.

Accordingly, the present invention is directed to a control and telemetry arrangement for an aerial missile. The arrangement comprises: (a) a digital telemetry system for receiving an analog input telemetry signal and producing and transmitting a digital output telemetry signal representing the current status of missile functions; (b) a battery capable of being switched from a non-conducting state to a conducting state and back to the non-conducting state; (c) a ground external power source; and (d) a latching relay connected between the digital telemetry system and the battery and between the system and external ground power and capable of being manually switched using ground power from a first state connecting the system external ground power to a second state to switch the battery from its non-conductive to conductive state for connecting power from the battery to the telemetry system and from the second state to the first state to switch the battery back to the non-conductive state for disconnecting power from the battery to the telemetry system and reconnecting ground external power.

The digital telemetry system of the present invention comprises: (a) a signal conditioner for receiving an analog input telemetry signal representing the current status of missile functions and producing a conditioned analog output telemetry signal: (b) a pulse code modulation (PCM) encoder connected to the signal conditioner for receiving the conditioned analog output telemetry signal therefrom and producing a digital output telemetry signal; (c) a pre-modulation filter connected to the PCM encoder for receiving the digital output telemetry signal therefrom and producing an alternating digital output signal; (d) a phase modulation (PM) transmitter connected to the pre-modulation filter for receiving the alternating digital output signal therefrom and producing a modulated output signal; and (e) an antenna connected to the PM transmitter for receiving the modulated output signal therefrom and radiating the modulated output signal from the missile to a ground receiving station.

The present invention also includes a method of transmitting a telemetry signal from a small diameter aerial missile to a ground station. The telemetry signal transmitting method comprises the steps of: (a) converting on a small diameter aerial missile an analog input telemetry signal representing the current status of missile functions to a modulated alternating digital output telemetry signal; (b) transmitting the modulated alternating digital output telemetry signal from the aerial missile to a ground station; and (c) reconverting at the ground station the modulated alternating digital output telemetry signal back to the analog input telemetry signal.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
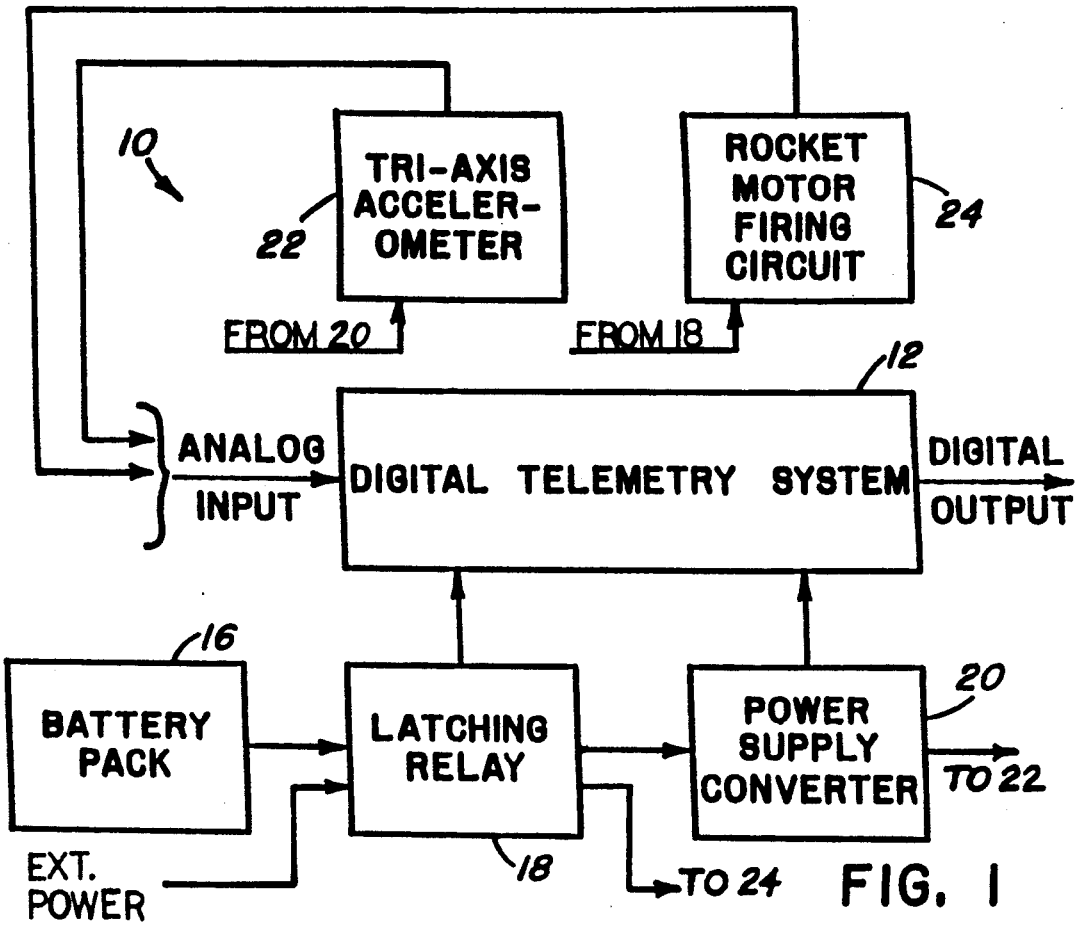
FIG. 1 is a general block diagram of a control and digital telemetry arrangement in accordance with the present invention for employment in a small diameter aerial missile.

Referring now to the drawings, and particularly to FIG. 1, there is illustrated a general block diagram of a control and telemetry arrangement 10 for a small diameter aerial missile (not shown). The control and telemetry arrangement 10 includes a digital telemetry system 12 and other associated components which are packaged by a cannister 14 (FIGS. 3 and 4) for mounting in the small diameter missile. The components housed in the aerial missile and interfaced with the digital telemetry system 12 include a pack of multiple batteries 16, a latching relay 18, a power supply converter 20, a tri-axis accelerometer 22, and a rocket motor firing circuit 24.

The batteries 16 are of the type switchable between non-conducting and conducting states. The latching relay 18 permits manual switching from a first state to a second state to complete an electrical path between the telemetry system 12 and the battery pack 16 so as to permit latching out of external ground power and latching in of the onboard power from the battery pack 16 a few minutes before missile launch. In case the launch is aborted, then the latching relay 18 can be switched back to the first state from the second state to latch out the onboard power and latch back in the external ground power. The use of nicad batteries in the battery pack 16, instead of thermal batteries which cannot be switched off once switched on, avoids delays in removal and replacement of the batteries after an aborted launch.

The power supply converter 20 is provided for converting the positive output voltage level, for example +28 volts, of the battery pack 16 to positive and negative voltage levels, for example +15 volts and −15 volts, which are required to operate some cf the components of the telemetry system 12. The tri-axis accelerometer 22 is connected to the telemetry system 12 to continuously provide data concerning the gravity forces of the aerial missile to the telemetry system 12. The firing circuit 24 obtains power from the latching relay 18, however, firing cannot occur until the missile by means known to those skilled in the art permits such to occur. It should be understood that the firing circuit is not a part of the invention. It merely provides one analog input to the invention.

Figure 2:
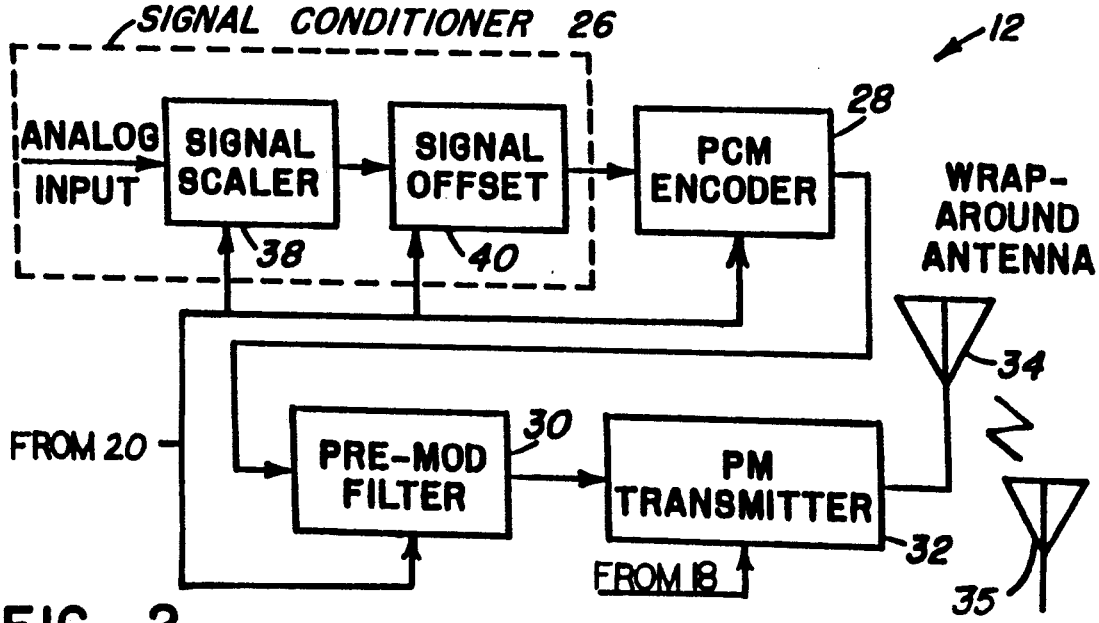
FIG. 2 is a detailed block diagram of the digital telemetry system of the arrangement of FIG. 1.

FIG. 2 illustrates a detailed block diagram of the digital telemetry system 12 of the present invention. In a serial arrangement, the telemetry system 12 includes a signal conditioner 26, a pulse code modulation (PCM) encoder 2B, a pre-modulation filter 30, a phase modulation (PM) transmitter 32, and a wrap-around antenna 34. These components of the system 12 are individually well-known and thus need only be shown in block form. To illustrate these components in greater detail would not contribute to a better understanding of the invention but instead would only make the explanation of the invention more complex.

More particularly, the signal conditioner 26 is connected via an input connector 36 (FIG. 3) to receive analog input telemetry status signal from other components of the missile including but not limited to the tri-axis accelerometer 22 and the rocket motor firing circuit 24 which contains data concerning missile functions. Typically, the analog input signals vary within a first range of positive and negative voltage levels, such as between +100 volts and −100 volts. The signal conditioner 26 shown in FIG. 2 includes a signal scaler 38 which proportionally scales down the analog input signal to a second range of positive and negative voltage levels which is much narrower than the first range, for example between +2.5 volts and −2.5 volts. The signal conditioner 26 also includes a signal offset 40 which receives the scaled down voltage from the signal scaler 38 and shifts it such that all voltage levels in the second range are now positive, such as between 0 and +5 volts.

The PCM encoder 28 is connected to the signal offset 40 of the signal conditioner 26 and receives the scaled down and positive offset voltage. The encoder 28 multiplexes the positive offset analog voltage and digitizes and encodes it into a positive digital signal, such as between 0 and +5 volts. The pre-modulation filter 30 receives the positive digital signal and offsets it to a third range of positive and negative voltage levels, which is narrower than the second range, for example between +1 volt and −1 volt, to provide an alternating digital output signal. The PM transmitter 32 is connected to the pre-modulation filter 30 and receives the alternating digital signal therefrom for modulating its output. The modulated output of the PM transmitter 32 is received by the antenna 34 and radiated to a receiving station on the ground. The ground station 35 reverses the above analog to digital process and reconverts the modulated signal back to the original missile analog input voltages. Missile data is then derived by on-ground computers from the original voltages.

Figure 3:
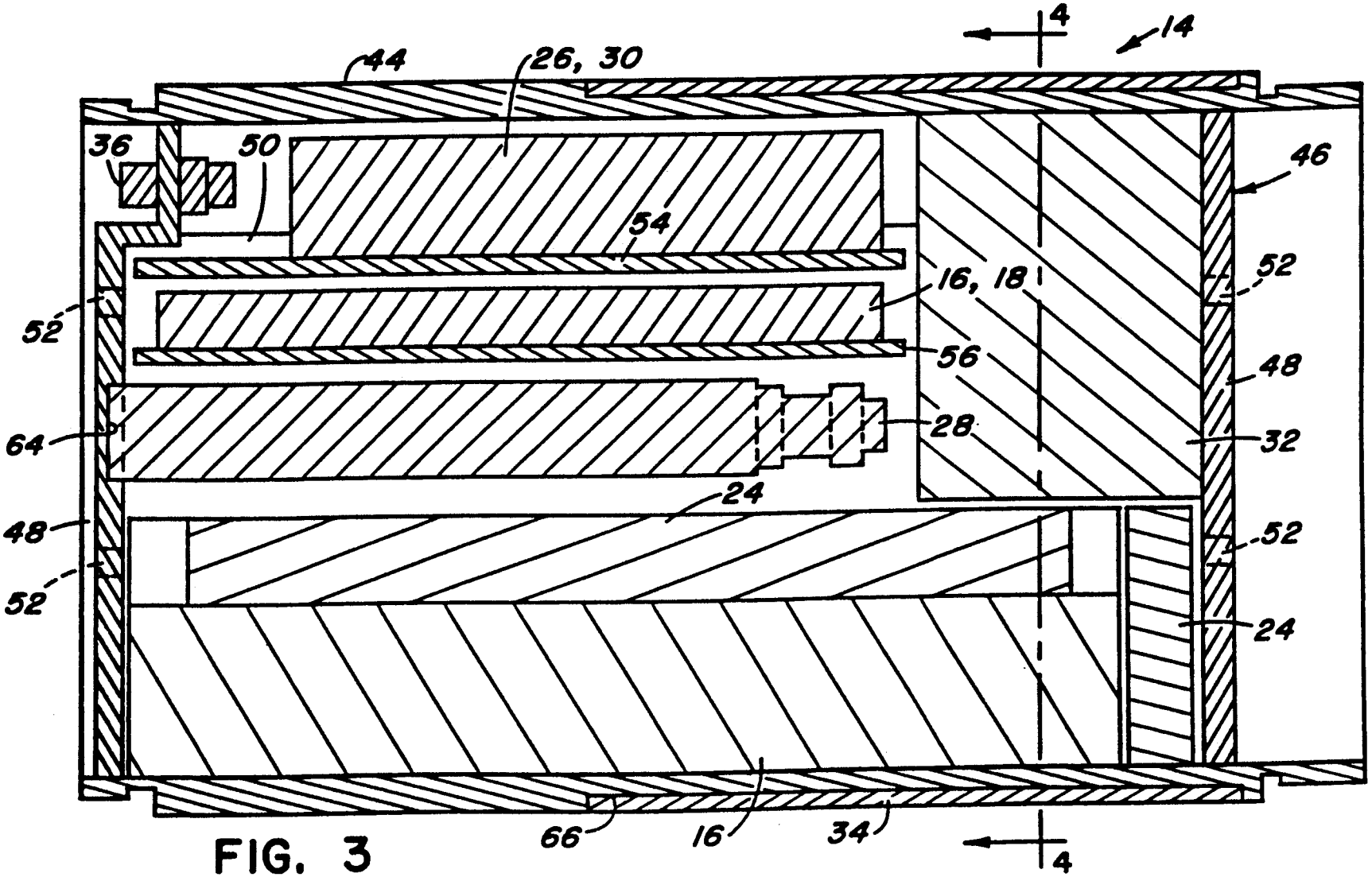
FIG. 3 is an axial sectional view of a cannister compactly housing the digital telemetry system and associated components of the arrangement of FIG. 1.
Figure 4:
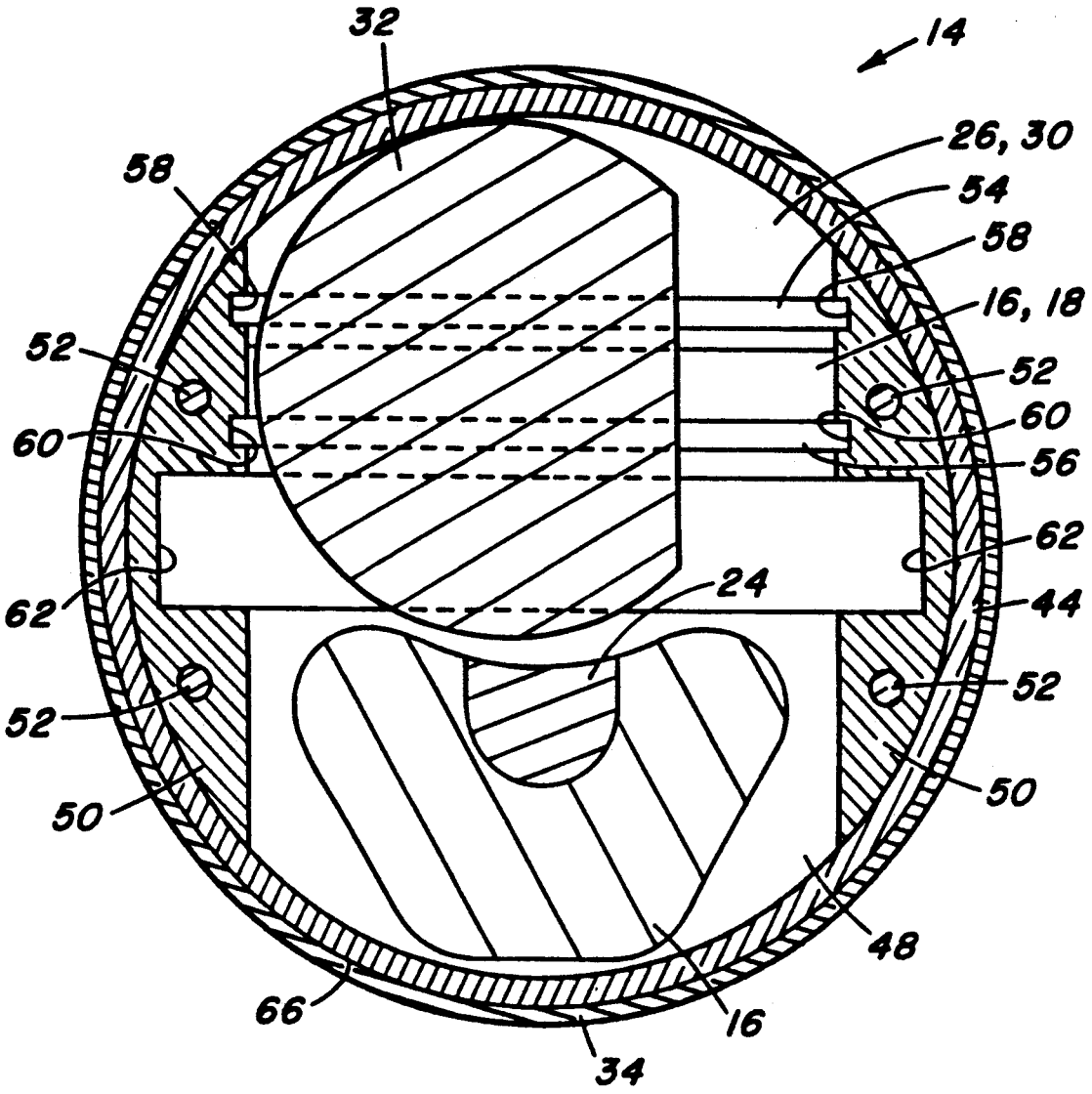
FIG. 4 is a cross-sectional view of the cannister taken along line 4—4 of FIG. 3.

Referring to FIGS. 3 and 4, a cannister 14 is provided for compactly packing the above-described components in the small diameter missile. The cannister 14 includes an outer cylindrical housing 44 and a packaging assembly 46 for mounting the above-described components within the housing 44. The packaging assembly 46 includes a pair of opposite end bulkheads 48 and a pair of opposing side support plates 50. The bulkheads 48 have circular configurations and outside diameter sizes adapting them to snugly fit within the inside diameter of the opposite ends of the cylindrical housing 44. The side support plates 50 extend between and are attached by fasteners 52 to the bulkheads 48 so as to leave unfilled opposite circumferential sectors of the packaging assembly 46 located between the support plates 50. The packaging assembly 46 once inserted within the housing 44 is attached thereto by fasteners (not shown).

The signal conditioner 26 and pre-mod filter 30 of the telemetry system 12 are supported on a first mounting board 54. The power supply converter 16 and latching relay 18 are supported on a second mounting board 56. The first and second mounting boards 54, 56 are, in turn, mounted in spaced pairs of longitudinal slots 58, 60 formed in the interiors of the side support plates 50. The PCM encoder 28 is mounted in spaced slots 62 in the side support plates 50 and a slot 64 in the one of the end bulkheads 48 which also mounts the input connector 36. The PM transmitter 32 is disposed between inner ends of the first and second boards 54, 56 and the other one of the end bulkheads 48 and attached by screws (not shown) to the one end bulkhead. The battery pack 16 and firing circuit are disposed below the PCM encoder 28 and PM transmitter 32 of the telemetry system 12. The antenna 34 of the telemetry system 12 is of the wrap-around type and is mounted in a circumferential recess 66 formed in the exterior of the housing 44.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely a preferred or exemplary embodiment thereof.

Having thus described the invention, what is claimed is:

1. A control and telemetry arrangement for an aerial missile having a rocket motor, the combination comprising:

(a) a digital telemetry system for receiving an analog input telemetry signal and producing and transmitting a digital output telemetry signal representing the current status of missile functions;

(b) a battery capable of being switched from a non-conducting state; and (c) a latching relay connected between said digital telemetry system and said battery and capable of being switched from a first state to a second state to switch said battery from its non-conductive to conductive state for connecting power from said battery to said state for connecting power from said second state to said first state to switch said battery back to said non-conductive state for disconnecting power from said battery to said telemetry system and reconnecting ground power.

2. The arrangement of claim 1 further comprising:

power supply converter connected to said latching relay and being operable when said relay is switched to said second state for receiving power from said battery and converting the power to levels required for operation of said telemetry system.

3. The arrangement of claim 1 further comprising:

a tri-axis accelerometer connected to said telemetry system and being operable to continuously provide data concerning the orientation of the aerial missile to said telemetry system.

4. The arrangement of claim 1 wherein said telemetry system includes a signal conditioner for receiving the analog input telemetry signal representing the current status of missile functions and producing a conditioned analog output telemetry signal.

5. The arrangement of claim 4 wherein said telemetry system also includes a pulse code modulation (PCM) encoder connected to said signal conditioner for receiving the conditioned analog output telemetry signal therefrom and producing a digital output telemetry signal.

6. The arrangement of claim 5 wherein said telemetry system also includes a pre-modulation filter connected to said PCM encoder for receiving the digital output telemetry signal therefrom and producing an alternating digital output signal.

7. The arrangement of claim 6 wherein said telemetry system also includes a phase modulation (PM) transmitter connected to said pre-modulation filter for receiving said alternating digital output signal therefrom and producing a modulated output signal.

8. The arrangement of claim 7 wherein said telemetry system also includes an antenna connected to said PM transmitter for receiving said modulated output signal therefrom and radiating said modulated output signal from the missile to a ground receiving station.

9. The arrangement of claim 1 further comprising:

a cannister containing said digital telemetry system and said firing circuit, battery and latching relay and being mountable in the aerial missile.

10. The arrangement of claim 9 wherein said cannister includes:

an outer cylindrical housing; and a packaging assembly for packing said telemetry system, firing circuit, battery and latching relay within said housing.

11. The arrangement of claim 10 wherein said packaging assembly includes:

a pair of opposite end bulkheads having circular configurations and outside diameter sizes adapting them to snugly fit within the inside diameter of opposite ends of said cylindrical housing; and a pair of opposing side support plates extending between and attached to said bulkheads.

12. The arrangement of claim 11 wherein said side support plates have a plurality of longitudinal slots formed therein and extending between said bulkheads for mounting some of the components of said telemetry system.

13. A digital telemetry system for an aerial missile, comprising:

(a) a signal conditioner for receiving an analog input telemetry signal representing the current status of missile functions and producing a conditioned analog output telemetry signal;

(b) a pulse code modulation (PCM ) encoder connected to said signal conditioner for receiving the conditioned analog output telemetry signal therefrom and producing a digital output telemetry signal;

(c) a pre-modulation filter connected to said PCM encoder for receiving the digital output telemetry signal therefrom and producing an alternating digital output signal;

(d) a phase modulation (PM) transmitter connected to said pre-modulation filter for receiving said alternating digital output signal therefrom and producing a modulated output signal; and (e) an antenna connected to said PM transmitter for receiving said modulated output signal therefrom and radiating said modulated output signal from the missile to a ground receiving station.

14. The system of claim 13 wherein said signal conditioner includes a signal scaler for receiving the analog input signal which varies within a first range of positive and negative voltage levels and proportionally scaling down the analog input signal to a second range of positive and negative voltage levels which is narrower than the first range thereof.

15. The system of claim 14 wherein said signal conditioner further includes a signal offset for receiving the scaled down voltage within the second range from the signal scaler and shifting it such that all voltage levels in the second range are now positive to produce a scaled down and positive offset voltage representing said conditioned analog output telemetry signal.

16. The system of claim 15 wherein said PCM encoder is connected to said signal offset of said signal conditioner for receiving, multiplexing and encoding said scaled down and positive offset voltage and producing a positive digital output signal.

17. The system of claim 16 wherein said premodulation filter is connected to said PCM encoder for receiving said positive digital output signal and offseting it to a third range of positive and negative voltage levels being narrower than the voltage levels of said second range to produce an alternating digital output signal.

18. The system of claim 17 wherein said antenna is a wrap-around type antenna.

19. A method of transmitting a telemetry signal from a small diameter aerial missile to a ground station, said method comprising the steps of:

(a) converting on a small diameter aerial missile an analog input telemetry signal representing the current status of missile functions to a modulated alternating digital output telemetry signal;

(b) transmitting the modulated alternating digital output telemetry signal from the aerial missile to a ground station: and (c) reconverting at the ground station the modulated alternating digital output telemetry signal back to the analog input telemetry signal.

20. The method of claim 19 wherein said step of converting includes receiving the analog input telemetry signal and producing a conditioned analog output telemetry signal therefrom.

21. The method of claim 20 wherein said step of producing the conditioned signal includes receiving the analog input telemetry signal which varies within a first range of positive and negative voltage levels and proportionally scaling down the analog input signal to a second range of positive and negative voltage levels which is narrower than the first range thereof to produce a scaled down voltage within the second range.

22. The method of claim 21 wherein said step of producing the conditioned signal includes receiving the scaled down voltage within the second range and shifting it such that all voltage levels in the second range are now positive to produce a scaled down and positive offset voltage representing the conditioned analog output telemetry signal.

23. The method of claim 20 wherein said step of converting further includes receiving the conditioned analog output telemetry signal and producing a positive digital output telemetry signal therefrom.

24. The method of claim 23 wherein said step of producing the positive digital output telemetry signal includes receiving, multiplexing and encoding the conditioned analog output telemetry signal and producing the positive digital output signal.

25. The method of claim 23 wherein said step of converting further includes receiving the positive digital output telemetry signal and producing an alternating digital output signal therefrom.

26. The method of claim 25 wherein said step of producing the alternating digital output signal includes receiving the positive digital output signal and offseting it to a range of positive and negative voltage levels to produce the alternating digital output signal.

27. The method of claim 25 wherein said step of converting further includes receiving the alternating digital output signal and producing the modulated alternating digital output signal therefrom.

28. The method of claim 27 wherein said step of transmitting includes receiving and radiating the modulated alternating digital output signal from the missile to a ground receiving station.

* * * * *